G. F. Shaw.
Mower.

No. 107,108.  Patented Sep. 6, 1870.

Witnesses.  
Inventor.  
George F. Shaw

United States Patent Office.

GEORGE F. SHAW, OF WEST ROXBURY, MASSACHUSETTS.

Letters Patent No. 107,108, dated September 6, 1870.

IMPROVEMENT IN MOWING-MACHINES.

The Schedule referred to in these Letters Patent and making part of the same

To all whom it may concern:

Be it known that I, GEORGE F. SHAW, of West Roxbury, in the county of Norfolk and State of Massachusetts, have invented an Improvement in Mowing-Machines, of which the following is a full, clear, and exact description, reference being had to the accompanying drawing making part of this specification, in which—

In mowing-machines as heretofore constructed, the rapid and instantaneous changes in the direction of the motion of the cutter-bar, as it is operated by the throw of the pitman, produce a jar or vibration of the machine which is extremely unpleasant to the rider, and also causes a considerable amount of wear, this vibration being due to the shock produced by suddenly arresting the cutter-bar at each end of its traverse, and starting it in the opposite direction.

My invention has for its object to overcome this difficulty, and consists in operating the cutter-bar by means of a crank, provided with a spring, which constantly keeps an oval guide attached to the cutter-bar in contact therewith, to enable it to be traversed thereby, the crank-shaft revolving in bearings attached to the cutter-bar, by which construction, should any shock occur by the crank moving the cutter-bar in either direction, it is received by the bearings of the crank connected with the finger-bar, which thus counteracts and equalizes the strain, so that no vibration or shock is communicated to the machine.

To enable others skilled in the art to understand and use my invention, I will proceed to describe the manner in which I have carried it out.

In the said drawing—

A represents the finger-bar of a mowing-machine, and

B its cutter-bar, to which are attached the knives or cutters $a$.

The power to operate the cutter-bar is transmitted from the wheels C C to a shaft, $b$, which drives a pulley, D, on its forward end.

Over this pulley D and another, E, passes a belt, G, which drives the crank H, secured to the shaft of the pulley E.

The crank-shaft revolves in bearings $c$, secured to the finger-bar, while the crank plays around in contact with the interior of a hollow oval guide, I, secured to the cutter-bar, the throw of which is cushioned by the pressure of a spring, $d$, surrounding a pin, $e$, which fits loosely and slides within a hole made in the crank for its reception. The spring constantly keeps the guide snugly up to the crank, as required.

Figure 1:
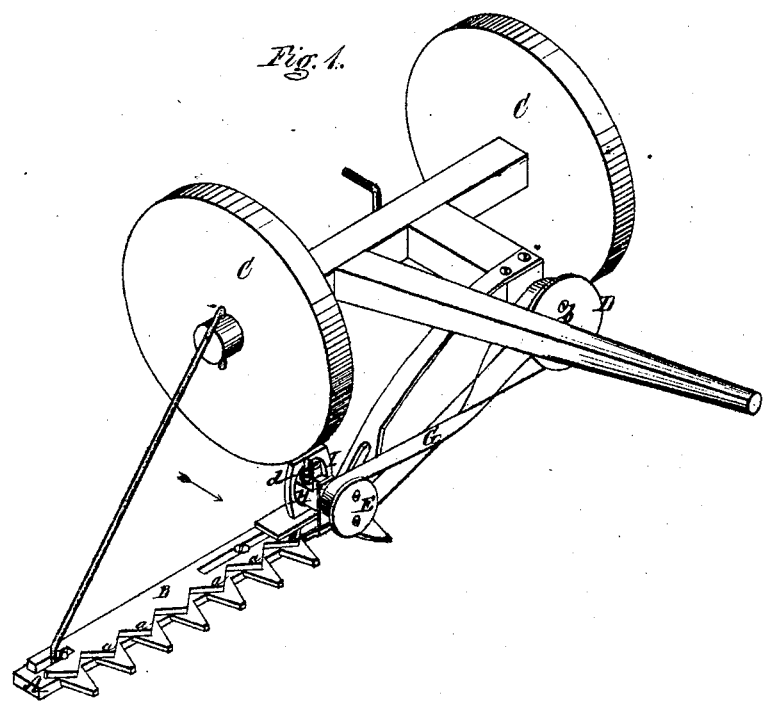
Figure 1 is a perspective view of a mowing-machine, with my improvement applied thereto.
Figure 2:
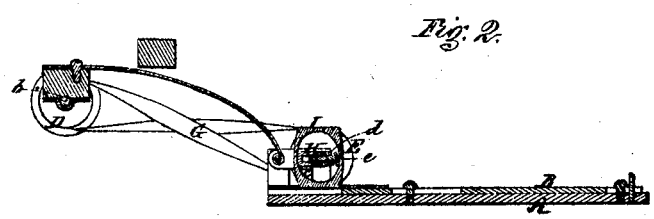
Figure 2 is a vertical section through the same in front of the wheels, and looking in the direction of the arrow.

The cutter-bar moves from the center to the end of its stroke in either direction, the greatest pressure being exerted by the spring when the crank is in the position seen in fig. 2, or that diametrically opposite, which thus serves to cushion the stroke, the shock produced by the cutter-bar being received by the crank-shaft, and being transferred to its bearings, and thence to the finger-bar.

What I claim as my invention, and desire to secure by Letters Patent, is—

A crank, H, provided with a spring, $d$, and revolving in bearings attached to the cutter-bar B, in combination with a hollow guide, I, secured to the finger-bar A, the several parts being arranged to operate substantially as and for the purpose described.

Witness my hand this 7th day of July, A. D. 1870.

GEORGE F. SHAW.

Witnesses:
W. J. CAMBRIDGE,
P. E. TESCHEMACHER.